US009954775B2

(12) United States Patent
Park et al.

(10) Patent No.: US 9,954,775 B2
(45) Date of Patent: Apr. 24, 2018

(54) SOFTWARE-DEFINED NETWORK (SDN) SYSTEM USING HOST ABSTRACTION, AND METHOD FOR IMPLEMENTING THE SAME

(71) Applicant: ELECTRONICS AND TELECOMMUNICATIONS RESEARCH INSTITUTE, Daejeon (KR)

(72) Inventors: Sae Hyong Park, Daejeon (KR); Byung Joon Lee, Daejeon (KR); Ji Soo Shin, Daejeon (KR); Tae Hong Kim, Daejeon (KR); Jae Ho You, Anyang-si (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 229 days.

(21) Appl. No.: 14/952,745

(22) Filed: Nov. 25, 2015

(65) Prior Publication Data

US 2016/0149806 A1 May 26, 2016

(30) Foreign Application Priority Data

Nov. 25, 2014 (KR) ........................ 10-2014-0165590
Nov. 9, 2015 (KR) ........................ 10-2015-0156717

(51) Int. Cl.
*H04L 12/28* (2006.01)
*H04L 12/713* (2013.01)
*H04L 12/24* (2006.01)

(52) U.S. Cl.
CPC ............ *H04L 45/586* (2013.01); *H04L 41/04* (2013.01); *H04L 41/12* (2013.01)

(58) Field of Classification Search
CPC ..................................................... H04L 45/586
USPC .......................................................... 370/254
See application file for complete search history.

(56) References Cited

U.S. PATENT DOCUMENTS

| 9,185,056 B2 | 11/2015 | Adams et al. | |
| 2013/0103817 A1* | 4/2013 | Koponen | G06F 9/45558 709/223 |
| 2013/0132531 A1* | 5/2013 | Koponen | H04L 41/0823 709/220 |
| 2013/0142048 A1* | 6/2013 | Gross, IV | H04L 47/12 370/235 |
| 2015/0124608 A1* | 5/2015 | Agarwal | H04L 47/122 370/235 |

FOREIGN PATENT DOCUMENTS

EP 2787698 A2 10/2014
KR 10-2014-0060583 A 5/2014

* cited by examiner

*Primary Examiner* — Samina Choudhry
(74) *Attorney, Agent, or Firm* — LRK Patent Law Firm (57) ABSTRACT

A software-defined network (SDN) system and method for implementing the same can construct a network having flexible network topology by abstracting switches and controllers, as well as a host connected to said switches, and controllers, thereby increasing scalability of a hierarchical SDN network. The SDN system includes a host part, an SDN switch part, and an SDN controller part.

12 Claims, 7 Drawing Sheets

SOFTWARE-DEFINED NETWORK (SDN) SYSTEM USING HOST ABSTRACTION, AND METHOD FOR IMPLEMENTING THE SAME

CROSS-REFERENCE TO RELATED APPLICATION(S)

This application claims priority from Korean Patent Application Nos. 10-2014-0165590, filed on Nov. 25, 2014, and 10-2015-0156717, filed on Nov. 9, 2015, in the Korean Intellectual Property Office, the disclosures of which are incorporated herein by references in its entirety.

BACKGROUND

1. Field

The following description relates to a software-defined network (SDN) system and a method for implementing the SDN system which can increase scalability and manageability of a hierarchical SDN-based network by abstracting not only SDN controllers and SDN switches, but also hosts that are connected to said SDN controllers and SDN switches to create them as virtual machines.

2. Description of the Related Art

In a software-defined network (SDN), a network is divided into a transport plane (or a data plane) and a control plane, wherein the transport plane queries all decisions related to packet transmission to the control plane, thereby allowing for centralized control of both network architecture and packet flow via software installed on the control plane.

The current SDN technology is in progress of research and development regarding not only the construction of a large-scale SDN network, but also regarding the interworking between large-scale SDN networks.

However, as an SDN network is hierarchical, an existing SDN implementation method, according to which an SDN network is constructed by abstracting only switches and controllers but not hosts, may experience a significant degradation of scalability of the network because the information regarding hosts under control of upper-level controllers, specifically, the highest-level controller, is exponentially increased, which may cause network service disconnection and errors.

SUMMARY

The following description relates to a software-defined network (SDN) system which can construct a network having flexible network topology by abstracting not only switches and controllers, but also hosts connected to said switches and controllers, thereby increasing scalability of a hierarchical SDN network, and a method for implementing said SDN system.

In one general aspect, there is provided a software-defined network (SDN) system using host abstraction, including: a host part comprising at least one host defined as a virtual machine using a representative network address and being configured to transmit transmission data; an SDN switch part comprising at least one SDN switch which is defined as a virtual machine and is configured to directly transmit the transmission data received from the host to a destination host or transmit packet-in data that contains the transmission data to an SDN controller in order to send the transmission data to the destination host; and an SDN controller part comprising at least one SDN controller which is configured to construct a sub-network to implement a network topology according to controller rules by creating at least one virtual SDN switch and at least one virtual host, as well as transmit the received packet-in data to a destination SDN controller or to an upper-level SDN controller.

In the host part, one of concepts of addressing including a classful addressing system, a classless inter-domain routing (CIDR) addressing system, and a locator identifier separation protocol (LISP) may be used as the representative network address.

The SDN switch part may directly transmit the transmission data received from the host part to the destination host if the destination host is present in the same sub-network as the host part, and otherwise, the SDN switch part may transmit the packet-in data that contains the transmission data to the SDN controller.

In a case where the SDN controller is connected to an upper-level SDN controller, the SDN controller may serve as an SDN switch of the upper-level SDN controller.

The SDN controller part may further include: a flow translator configured to obtain the network topology information by translating received or predesignated controller rules; a virtual machine creator configured to create at least one virtual SDN switch and at least one virtual host that is connected to the SDN switch so as to construct a sub-network with the virtual SDN switch and the virtual host according to the obtained network topology information; and a packet-in data transmitter configured to transmit the received packet-in data to an SDN controller of the destination host if said SDN controller of the destination host is connected to the same upper-level SDN controller as the packet-in data transmitter is connected, and otherwise, transmit the received packet-in data to a corresponding upper SDN controller that is one level higher than the upper-level SDN controller.

The SDN controller part may transmit the packet-in data in the form of a query to the upper-level SDN controller.

In another general aspect, there is provided a method for implementing a software-defined network (SDN) using host abstraction, including: transmitting, at least one host that is defined as a virtual machine using a representative network address, transmission data; transmitting the transmission data received from the host directly to a destination host or transmitting packet-in data that contains the transmission data to an SDN controller in order to send the transmission data to the destination host; and constructing a sub-network to implement a network topology according to controller rules by creating at least one virtual SDN switch and at least one virtual host, as well as transmitting the received packet-in data to a destination SDN controller or to an upper-level SDN controller.

In the transmission of the transmission data, one of concepts of addressing including a classful addressing system, a classless inter-domain routing (CIDR) addressing system, and a locator identifier separation protocol (LISP) may be used as the representative network address.

In the transmission of the packet-in data, the transmission data received from the host may be directly transmitted to the destination host if the destination host is present in the same sub-network as the host that has sent the transmission data, and otherwise, the packet-in data that contains the transmission data may be transmitted to the SDN controller.

In the transmission of the packet-in data to the SDN controller, in a case where the SDN controller is connected to an upper-level SDN controller, the SDN controller may serve as an SDN switch of the upper-level SDN controller.

The transmission of the packet-in data to the SDN controller may include: obtaining the network topology information by translating received or predesignated controller rules; creating at least one virtual SDN switch and at least one virtual host that is connected to the SDN switch so as to construct a sub-network with the virtual SDN switch and the virtual host according to the obtained network topology information; and transmitting the received packet-in data to an SDN controller of the destination host if said SDN controller of the destination host is connected to the same upper-level SDN controller as the SDN controller that has received the packet-in data is connected, and otherwise, transmitting the received packet-in data to a corresponding upper SDN controller that is one level higher than the upper-level SDN controller.

In the transmission of the packet-in data to the SDN controller, the packet-in data may be transmitted in the form of a query to the upper-level SDN controller Other features and aspects will be apparent from the following detailed description, the drawings, and the claims.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems to described herein will be suggested to those of ordinary skill in the art. Also, descriptions of well-known functions and constructions may be omitted for increased clarity and conciseness.

It will be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Hereinafter, a software-defined network (SDN) system using host abstraction and a method for implementing an SDN network according to exemplary embodiments of the present disclosure will both be described with reference to the accompanying drawings.

Figure 1:
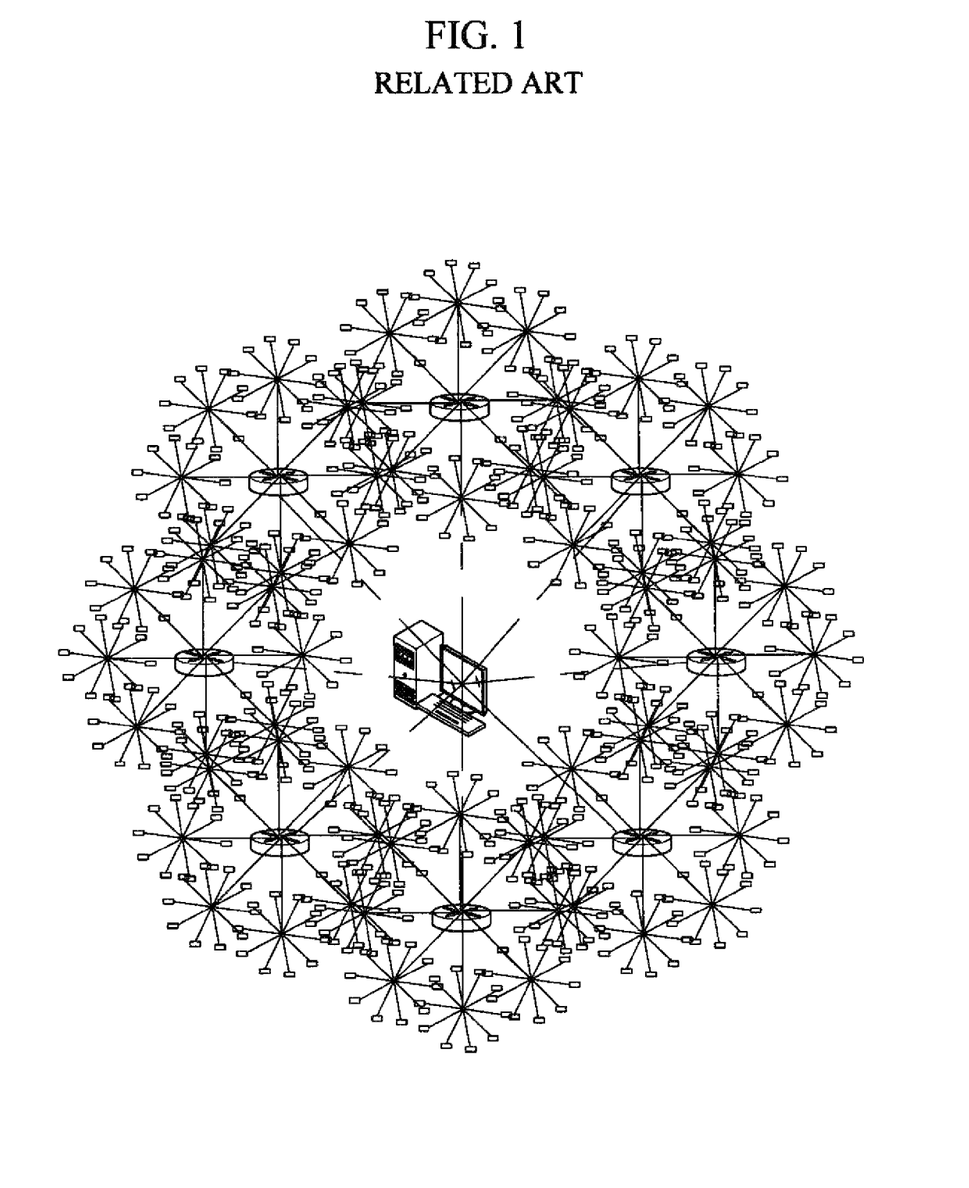
FIG. 1 is a diagram illustrating a conventional hierarchical software-defined network (SDN) network.

FIG. 1 is a diagram illustrating a conventional hierarchical SDN network.

Referring to FIG. 1, the conventional hierarchical SDN network is established by abstracting only switches and ports, excluding a host, so that information about hosts under the control of upper-level controllers, and particularly, the highest controller, can be exponentially increased.

As a result, a probability of the network itself having structural limitations in terms of scalability is increasing, which may lead to network service disconnection and errors.

Figure 2:
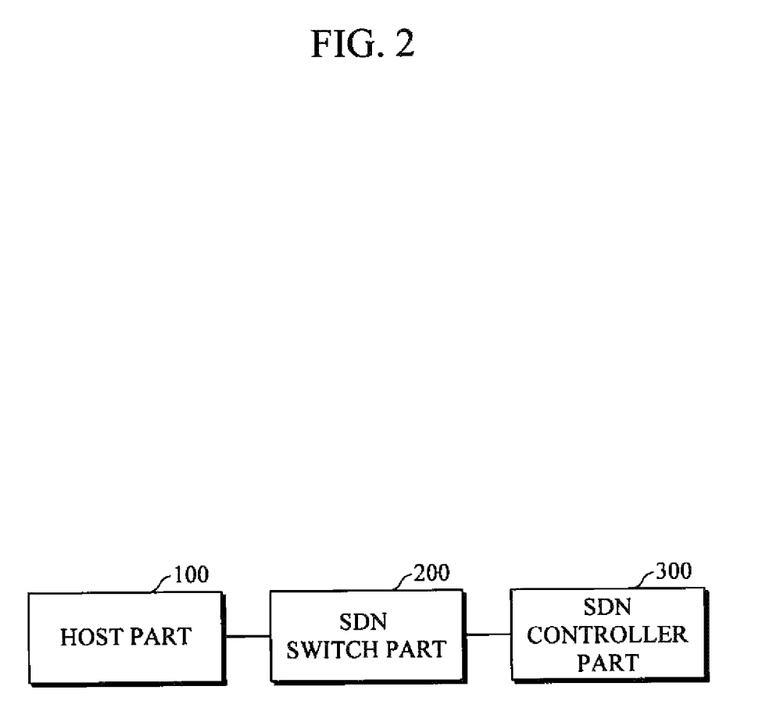
FIG. 2 is a diagram illustrating an SDN system using host abstraction according to an exemplary embodiment.

FIG. 2 is a diagram illustrating an SDN system using host abstraction according to an exemplary embodiment.

Referring to FIG. 2, an SDN system 1000 using host abstraction may include a host part 100, an SDN switch part 200, and an SDN controller part 300.

The host part 100 may include at least one host which is defined as a virtual machine using a representative network address, and it may transmit transmission data received from a user to an SDN switch.

In this case, the host may refer to a terminal that is capable of centralized control such that programs or data files can be executed and transmitted to other hosts during a long distance communication with a computer network.

Generally, a physical computing device, such as a computer, a server, or a mobile communication terminal, may be used as a host. In the exemplary embodiment, computing resources are obtained from a computing device, such as a server or a user's terminal connected to a host, and then a host may be created as a virtual machine through abstraction thereof.

Here, abstraction may refer to a combination of computing resources and its various devices into a single resource and the establishment of an abstracted layer that includes at least one virtual machine capable of executing a task for a certain purpose using the combined single resource such that the computing performance is not limited to a specific type of physical device or to a specific provider.

According to the exemplary embodiment, a method of abstracting as few as one host or as many as needed using a representative network address may be used.

In the exemplary embodiment, a concept of addressing, such as a classful addressing system, a classless inter-domain routing (CIDR) addressing system, and a locator identifier separation protocol (LISP), may be, used as the representative network address, but aspects of the present disclosure are not limited thereto.

The SDN switch part 200 may include at least one SDN switch that is defined as a virtual machine. The SDN switch directly transmits transmission data received from one host to a destination host or generates packet-in data that contains the transmission data and transmits the packet-in data to the SDN controller part.

The SDN switch may refer to a device that controls and operates the network, as if software were in place, according to specified policies received from the SDN controller part, regarding traffic forwarding and packet processing.

According to the exemplary embodiment, it is possible acquire computing resources from a connected terminal of a user or from a server and thus create a virtual SDN switch through the abstraction of said switch.

According to the exemplary embodiment, at least one host included in the host part 100 and the SDN controllers may be connected to each other through a one-to-many relationship.

The packet-in data may refer to data that contains both the transmission data received from a host and identification information about a destination of the transmission data.

In the exemplary embodiment, OpenFlow-based packet-in data may be used, but aspects of the present disclosure are not limited thereto.

According to an exemplary embodiment, if a destination host of the transmission data received from one host belongs to the same sub-network as the host that sent the transmission data, the SDN switch may transmit the transmission data directly to the destination host, and otherwise, the SDN switch may transmit packet-in data that contains the transmission data to an SDN controller.

Here, the sub-network refers to a network that is implemented by one SDN controller using a specific network topology.

The SDN controller part 300 may include at least one SDN controller. The SDN controller may construct a sub-network to implement a network topology according to controller rules by creating at least one virtual SDN switch and at least one virtual host, as well as transmit received packet-in data to a destination SDN controller or to an upper-level SDN controller.

The controller rules may refer to information that includes details necessary for the SDN controller to construct a sub-network, such as the architecture, connection rules, and detailed information about each element. However, aspects of the present disclosure are not limited thereto, such that any information that is necessary for construction of a sub-network can be used without restriction.

The network topology may refer to the arrangement of elements of a network.

A mesh topology may be used as the network topology of the sub-network. However, aspects of the present disclosure are not limited thereto, such that various network topologies, such as start, bus, circular, and tree topologies.

The SDN controller part 300 will be described in detail with reference to FIG. 3.

Figure 3:
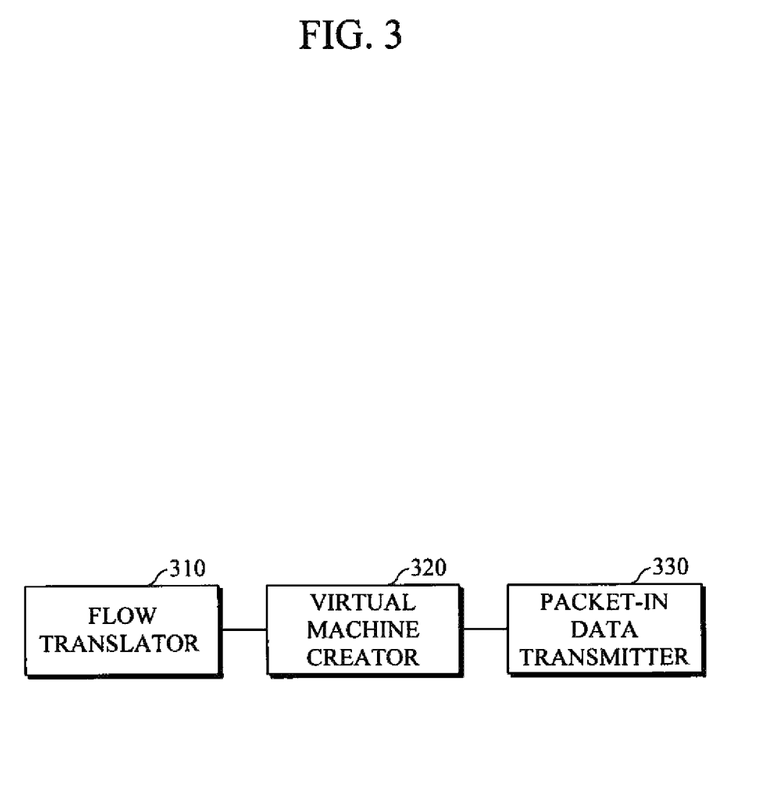
FIG. 3 is a diagram illustrating in detail the SDN controller part of FIG. 2.

FIG. 3 is a diagram illustrating in detail the SDN controller part of FIG. 2.

Referring to FIG. 3, the SDN controller part 300 may include a flow translator 310, a virtual machine creator 320, and a packet-in data transmitter 330.

The flow translator 310 may obtain network topology information by translating received or predetermined controller rules.

The controller rules may be designated in advance, received as an input from a network administrator, or received from an upper-level SDN controller.

According to an exemplary embodiment, the network topology information may indicate information about the formation and elements of a network to be constructed by the SDN controller according to the controller rules.

According to the network topology it has obtained, the virtual machine creator 320 may construct a sub-network, for which the virtual machine creator 320 may create at least one virtual SDN switch that is a component of the sub-network and at least one virtual host that is connected to said SDN switch.

According to the exemplary embodiment, it is possible to create a virtual machine using the aforesaid abstraction method.

According to the one exemplary embodiment, the virtual machines may be created by abstracting at least one SDN switch and at least one host connected to said SDN switch, and hosts and the SDN switch may be connected to each other through a many-to-one (N:1) relationship. Each SDN switch connected to at least one host may be connected to an SDN controller, for which multiple SDN switches may be connected to an SDN controller through a many-to-one (N:1) relationship.

The packet-in data transmitter 330 may transmit the received packet-in data to an SDN controller of the destination host if said SDN controller is connected to the same upper-level SDN controller as the packet-in data transmitter 330 is connected. Otherwise, the packet-in data transmitter 330 may transmit the received packet-in data to a corresponding upper SDN controller that is one level higher than said upper-level SDN controller.

According to the exemplary embodiment, the SDN controller may be connected to the SDN switch, as well as to an upper-level SDN controller.

According to the exemplary embodiment, the SDN controller connected to the upper-level SDN controller may serve as an SDN switch of said upper-level SDN controller.

In addition, according to the exemplary embodiment, the packet-in data may be transmitted in a query to the SDN controller.

Figure 4:
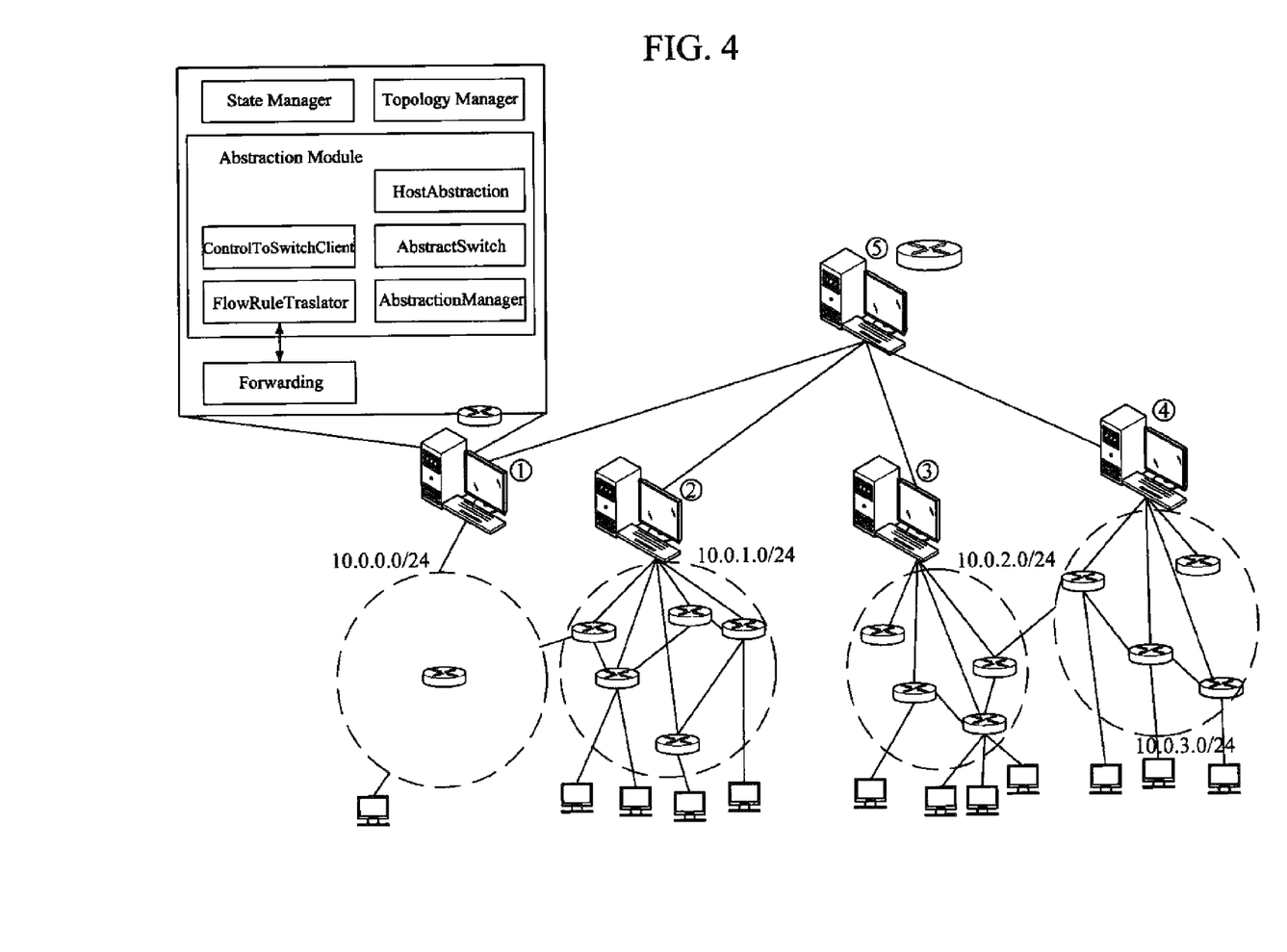
FIG. 4 is a diagram illustrating connections of an SDN system using host abstraction according to an exemplary embodiment.

FIG. 4 is a diagram illustrating connections of an SDN system using host abstraction according to an exemplary embodiment.

Referring to FIG. 4, SDN controllers may be hierarchically arranged in a network by using SDN switches to implement centralized network control.

According to the exemplary embodiment, a flow table of SDN switches may include a source IP address, a destination IP address, or hardware addresses (e.g., MAC addresses).

The SDN controller may be connected to an upper-level SDN controller while serving as an SDN switch of said upper-level SDN controller, which contains information about abstraction of said SDN controller. Layers of the SDN controllers may be recursively formed without any restriction on depth.

According to the exemplary embodiment, in the beginning stage of constructing a network, the network may be configured to have the same method as an existing SDN network configuration method according to a prior art, by using an SDN controller capable of being hierarchically connected to an abstraction module.

In one exemplary embodiment, layers of the SDN network may be formed using a method in which one controller in charge of one sub-network abstracts its own topology and is connected to an upper-level controller, serving as an SDN switch of said upper-level controller.

According to the exemplary embodiment, host abstraction may be implemented by using a concept of addressing as a representative network address system, such as a classful addressing system, a CIDR addressing system, and LISP. As few as one host or as many as needed may be abstracted using the representative network address.

According to the exemplary embodiment, if one host belongs to the same sub-network as a destination host, the host may transmit transmission data received from a user to a destination SDN switch in the same manner as in the conventional SDN network. Otherwise, the host may generate packet-in data that contains the transmission data and transmit the generated packet-in data to an upper-level SDN controller.

In response to receiving the packet-in data, the SDN controller may construct a network by creating a virtual SDN switch and at least one virtual host connected to said SDN switch according to network topology information obtained by translating received or predesignated controller rules, and send a flow message to a lower-level SDN controller or SDN switch.

In this case, since specified information about a lower-level topology is not known, the flow message is transformed to a specific form to contain the information about the lower-level topology, and thereafter a flow entry may be added to the flow message for flow processing, or a message indicating that a modification has taken place (e.g., FLOW_MOD) may be transmitted to switches.

According to the exemplary embodiment, once controller rules are updated, the SDN switch may process packets, without transmitting them to a controller, according to changed network topology information.

Figure 5:
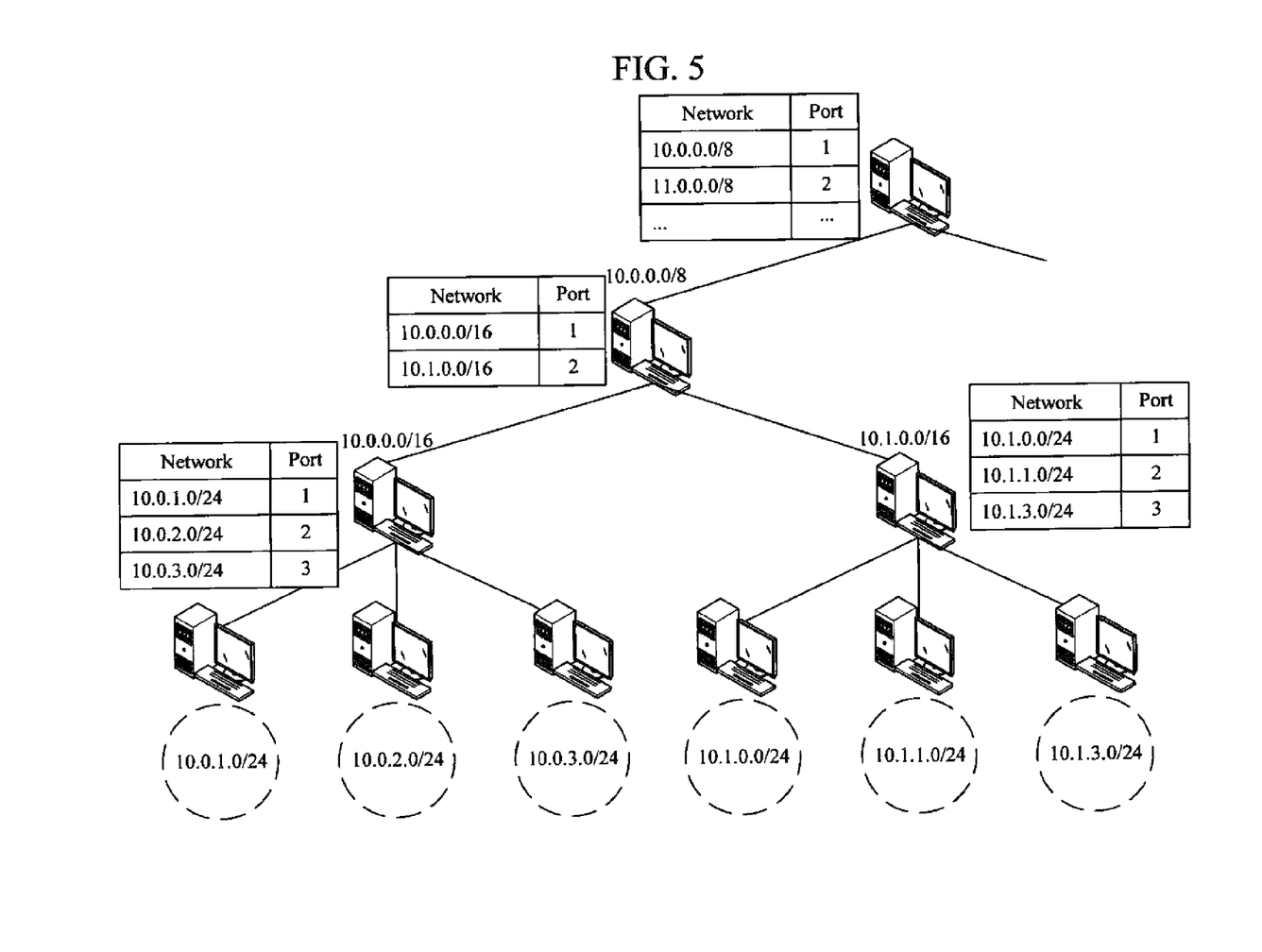
FIG. 5 is a diagram illustrating an SDN system using host abstraction in which a classful addressing scheme is used as an IP addressing system.

FIG. 5 is a diagram illustrating an SDN system using host abstraction in which a classful addressing scheme is used as an IP addressing system.

FIG. 5 illustrates a configuration of an SDN system that implements an SDN network using a classful scheme.

According to the exemplary embodiment, the SDN network is constructed using a classful mechanism, whereby an upper-level SDN controller and a lower-level SDN controller can be very intuitively connected to each other, thereby making it possible to easily abstract or integrate sub-networks.

According to the exemplary embodiment, when the very first lower-level SDN controller is connected to its upper-level SDN controller, the lower-level SDN may serve as an SDN switch by abstracting a domain thereof, and may be connected as an SDN switch to the upper-SDN controller.

According to the exemplary embodiment, the upper-level SDN controller may identify information on the lower-level SDN switch and perform a host integration process using a classful scheme. After the host integration process, if other SDN controllers, if any, exist on an upper level than said upper-level SDN controller, the network may be constructed according to the same method as an existing SDN network configuration method according to a prior art, by using an SDN controller capable of being hierarchically connected to an abstraction module.

According to the exemplary embodiment, like in the conventional SDN network implementation method, packets belonging to the same sub-network may operate regardless of the upper-level SDN controller. For communication with a host belonging to a different sub-network, a query may be sent in packet-in data form to the upper-level SDN controller.

In the present exemplary embodiment, in the case where information about the upper-level SDN controller is incorrect, said upper-level SDN controller may directly query an upper SDN controller that is one level higher.

According to the exemplary embodiment, information corresponding to the query may be converted into flow rules through the aforementioned method and received from the queried SDN controller, and it is after the received information has been converted in a manner that is appropriate to the network topology of the SDN controller that has received the information that communication takes place.

Figure 6:
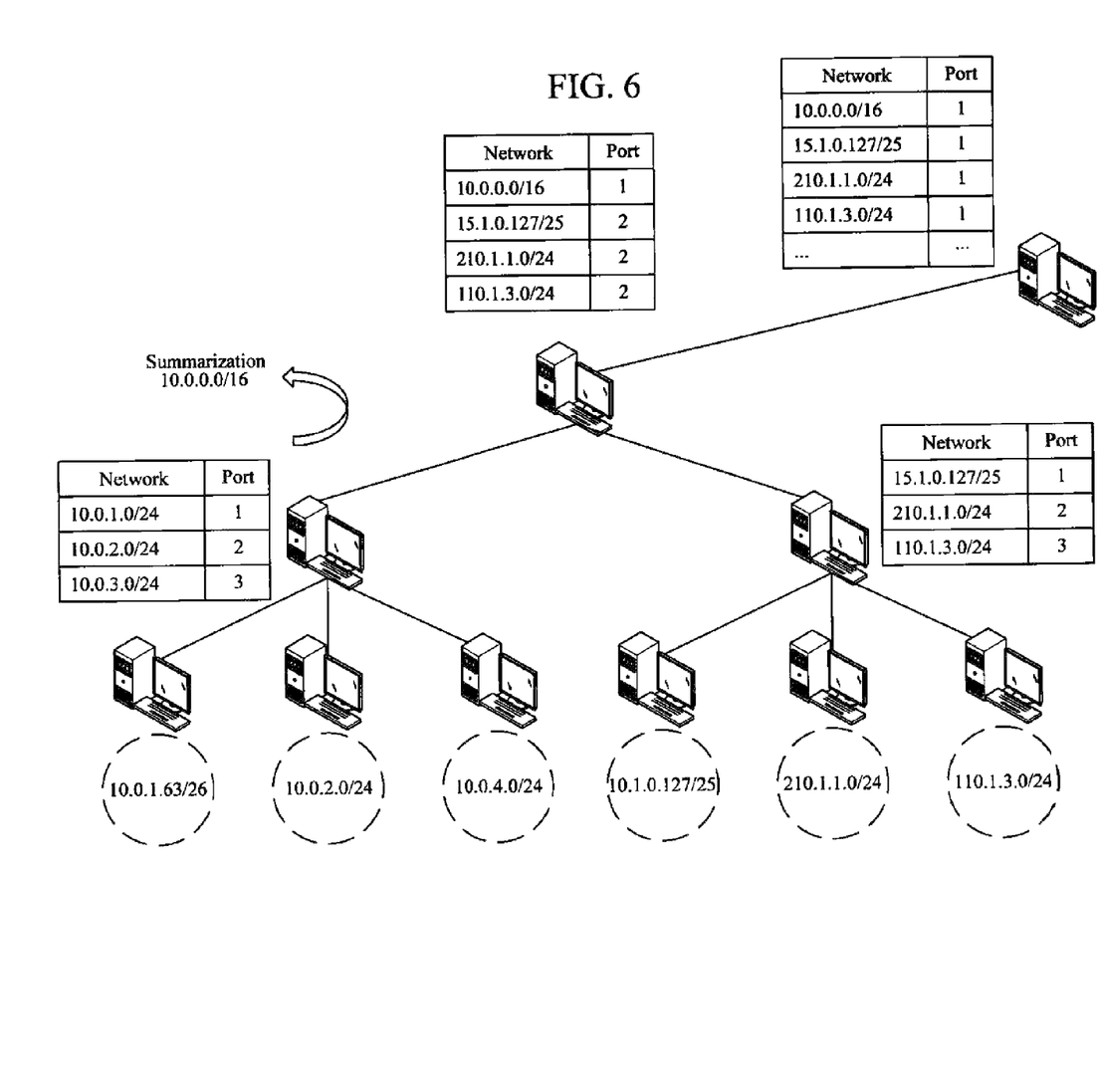
FIG. 6 is a diagram illustrating connections of an SDN system using host abstraction in which a classless inter-domain routing (CIDR) scheme is used as an IP addressing system according to an exemplary embodiment.

FIG. 6 is a diagram illustrating connections of an SDN system using host abstraction, in which a CIDR scheme is used as an IP addressing system according to an exemplary embodiment.

FIG. 6 illustrates a configuration of the SDN system using the CIDR scheme according to the exemplary embodiment.

In the present exemplary embodiment, hosts may be integrated, while network addresses may be integrated only when supernetting is possible. If supernetting is not possible, the abstraction or integration of higher levels may become more complex, compared to a classful scheme.

According to the exemplary embodiment, when a lower-level SDN controller is initially connected to an upper-level SDN controller, the lower-level SDN controller abstracts its domain and serves as an SDN switch connected to the upper-level SDN controller.

According to the exemplary embodiment, the upper-level SDN controller identifies information of lower-level switches and forwards network addresses in the form of a list to an upper-level controller.

In the present exemplary embodiment, the upper-level SDN controller may execute a host integration process. After the host integration process, if other SDN controllers, if any, exist on level that is higher than said upper-level SDN controller, the network may be constructed according to the same method as an existing SDN network configuration method according to a prior art, by using an SDN controller capable of being hierarchically connected to an abstraction module.

According to the exemplary embodiment, like in the conventional SDN network implementation method, packets belonging to the same sub-network may operate regardless of the upper-level SDN controller. For communication with a host belonging to a different sub-network, a query may be sent in packet-in data form to the upper-level SDN controller and then processed.

According to the exemplary embodiment, information corresponding to the query may be converted into flow rules through the aforementioned method and received from the queried SDN controller, and after the received information has been converted in a manner that is appropriate to the network topology of the SDN controller that has received the information, communication may take place.

Figure 7:
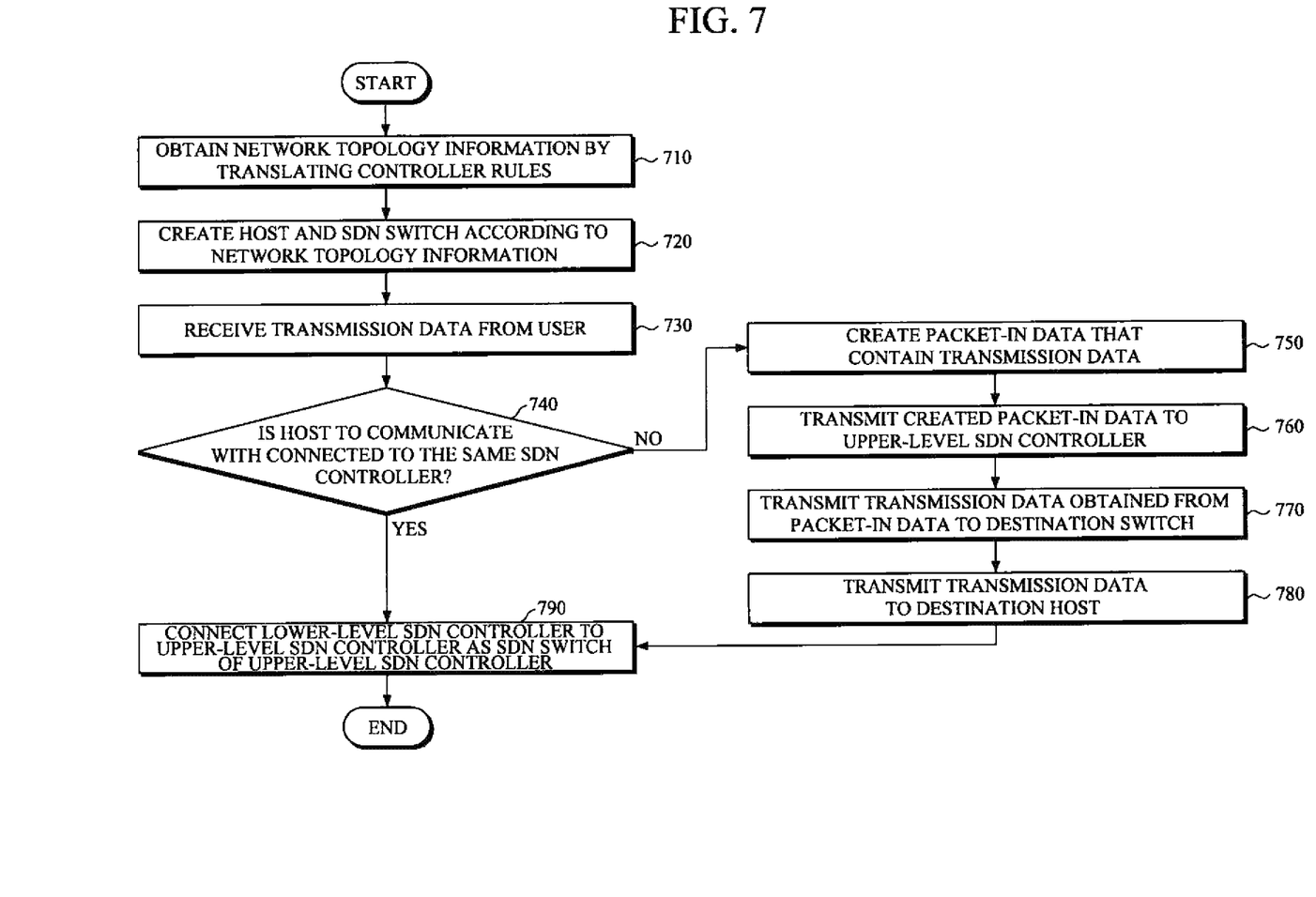
FIG. 7 is a flowchart illustrating a method for implementing an SDN network using host abstraction according to an exemplary embodiment.

FIG. 7 is a flowchart illustrating a method for implementing an SDN network using host abstraction according to an exemplary embodiment.

In 710, network topology information is obtained by translating controller rules.

According to the exemplary embodiment, the controller rules may be received or designated in advance.

According to the exemplary embodiment, the controller rules may be designated in advance, received as an input from a network administrator, or received from an upper-level SDN controller.

According to the exemplary embodiment, the network topology information may indicate information about the formation and elements of a network to be constructed by the SDN controller according to the controller rules.

In 720, a host and an SDN switch are generated according to the network topology information.

According to the exemplary embodiment, at least one virtual SDN switch and at least one virtual host that is connected to said SDN switch may be created so as to construct a sub-network with said SDN switch and said host according to the obtained network topology information.

According to the exemplary embodiment, the virtual machines may be created using the aforesaid abstraction method.

In the exemplary embodiment, the virtual machines may be created by abstracting at least one SDN switch and at least one host connected to said SDN switch, and hosts and the SDN switch may be connected to each other through a many-to-one (N:1) relationship. SDN switches, each of which are connected to at least one host, may be connected to an SDN controller through a many-to-one (N:1) relationship.

In 730, transmission data is received from a user.

In the exemplary embodiment, at least one host that is defined as a virtual machine using a representative network address may transmit the transmission data received from the user to the SDN switch.

In this case, the host may refer to a terminal that is capable of centralized control such that programs or data files can be executed and transmitted to other hosts during long distance communication with a computer network.

Generally, a physical computing device, such as a computer, a server, or a mobile communication terminal, may be used as a host. In the exemplary embodiment, computing resources are obtained from a computing device, such as a server or a user's terminal connected to a host, and then a host may be created as a virtual machine through abstraction thereof.

Here, abstraction may refer to a combination of computing resources and its various devices into a single resource and the establishment of an abstracted layer that includes at least one virtual machine capable of executing a task for a certain purpose using the combined single resource such that the computing performance is not limited to a specific type of physical device or to a specific provider.

According to the exemplary embodiment, a method of abstracting as few as one host or as many as needed using a representative network address may be used.

In the present exemplary embodiment, a concept of addressing, such as a classful addressing system, a classless inter-domain routing (CIDR) addressing system, and a locator/identifier separation protocol (LISP), may be used as the representative network address, but aspects of the present disclosure are not limited thereto.

In 740, it is determined whether a host to communicate with is connected to the same SDN controller.

According to the exemplary embodiment, it may be determined whether or not an SDN controller which is connected to a destination host of the received packet-in data is connected to the same upper-level SDN controller as the SDN controller that has received the packet-in data is connected.

According to the exemplary embodiment, if a destination host of the transmission data received from one host belongs to the same sub-network as the host that sent the transmission data, the transmission data may be directly transmitted to the destination host, and otherwise, packet-in data that contains the transmission data may be transmitted to an SDN controller.

In 750, a lower-level SDN controller is connected as an SDN switch to an upper-level SDN controller.

According to the exemplary embodiment, the SDN controller may be connected to an SDN switch, and the SDN controller may be connected to an upper-level SDN controller.

An SDN switch may refer to a device that controls and operates the network, as if software were in place, according to specified policies received from the SDN controller part, regarding traffic forwarding and packet processing.

According to the exemplary embodiment, the SDN controller connected to the upper-level SDN controller may serve as an SDN switch of said controller.

In 760, packet-in data that contains the transmission data is created.

According to the exemplary embodiment, if an SDN controller, to which a destination host of the received packet-in data is connected, is not connected to the same upper-level SDN controller as that to which the SDN controller that has received the packet-in data is connected, packet-in data that contains the transmission data may be created.

Packet-in data may refer to data that contain both the transmission data received from a host and identification information about a destination of the transmission data According to the exemplary embodiment, OpenFlow-based packet-in data may be used, but aspects of the present disclosure are not limited thereto.

In 770, the created packet-in data is transmitted to an upper-level SDN controller.

According to the exemplary embodiment, the packet-in data may be transmitted in the form of a query to the SDN controller.

In 780, the transmission data obtained from the packet-in data is transmitted to a destination SDN switch.

In the present exemplary embodiment, in response to receiving a packet-in message, the SDN controller may construct a network by creating a virtual SDN switch and at least one virtual host connected to said SDN switch according to network topology information obtained by translating received or predesignated controller rules, and thereafter the SDN controller may send a flow message to a lower-level SDN controller or SDN switch.

In this case, specified information about a lower-level topology is not known, and so the flow message is transformed to a specific form to contain information about the lower-level topology, and thereafter a flow entry may be added to the flow message for flow processing, or a message indicating that a modification has taken place (e.g., FLOW_MOD) may be transmitted to switches.

According to the exemplary embodiment, once controller rules are updated, the SDN switch may process packets, without transmitting them to a controller, according to changed network topology information.

In 790, the transmission data is transmitted to the destination host.

According to the exemplary embodiment, it is possible to transmit received transmission data to the destination host.

In order to overcome the structural problems of degradation in scalability due to the exponential increase of information about hosts that are under the control of the highest-level controller, not only switches and controllers, but also hosts connected to said switches and controllers are abstracted to construct a network having a flexible network topology, and thereby the scalability of a hierarchical SDN network can be maximized.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A software-defined network (SDN) system using a virtualized host, comprising:
    a processor; and
    a memory storing one or more units comprising computer executable code configured and executed by the processor,
    wherein the one or more units comprise:
    a host part comprising at least one host implemented as a virtual machine using a representative network address and being configured to transmit transmission data;

an SDN switch part comprising at least one SDN switch which is implemented as a virtual machine and is configured to directly transmit the transmission data received from the at least one host to a destination host or transmit packet-in data containing the transmission data to an SDN controller to send the transmission data to the destination host; and an SDN controller part comprising at least one SDN controller which is configured to construct a sub-network to implement a network topology according to controller rules by creating the at least one virtual SDN switch and the at least one virtual host, and configured to transmit the received packet-in data to a destination SDN controller or to an upper-level SDN controller which is one level higher than the destination SDN controller.

2. The SDN system of claim 1, wherein the host part uses the representative network address through one of addressing systems including a classful addressing system, a classless inter-domain routing (CIDR) addressing system, and a locator identifier separation protocol (LISP).

3. The SDN system of claim 1, wherein the SDN switch part directly transmits the transmission data received from the at least one host to the destination host if the destination host is present in a same sub-network as the at least one host is, and the SDN switch part transmits the packet-in data containing the transmission data to the SDN controller if the destination host is not present in the same sub-network as the at least one host is.

4. The SDN system of claim 1, wherein in a case where the SDN controller is connected to the upper-level SDN controller, the SDN controller serves as an SDN switch of for the upper-level SDN controller.

5. The SDN system of claim 1, wherein the at least one SDN controller comprises:
a flow translator configured to obtain information on the network topology by translating received or predesignated controller rules;
a virtual machine creator configured to create the at least one virtual SDN switch and the at least one virtual host that is connected to the at least one virtual SDN switch so as to construct a sub-network with the at least one virtual SDN switch and the at least one virtual host according to the obtained network topology information; and
a packet-in data transmitter configured to transmit the received packet-in data to an SDN controller of the destination host if the SDN controller of the destination host is connected to a same SDN controller as the packet-in data transmitter is, connected to, and configured to transmit the received packet-in data to a corresponding upper-level SDN controller that is one level higher than the same SDN controller.

6. The SDN system of claim 5, wherein the at least one SDN controller transmits the packet-in data in a form of a query to the upper-level SDN controller.

7. A method for implementing a software-defined network (SDN) using a virtualized host, the method being implemented by a processor executing instructions stored in a non-transitory computer-readable medium and the method comprising:
transmitting, by at least one host that is implemented as a virtual machine using a representative network address, transmission data;
transmitting the transmission data received from the at least one host directly to a destination host or transmitting packet-in data containing the transmission data to an SDN controller to send the transmission data to the destination host; and
constructing a sub-network to implement a network topology according to controller rules by creating at least one virtual SDN switch and at least one virtual host, and transmitting the received packet-in data to a destination SDN controller or to an upper-level SDN controller which is one level higher than the destination SDN controller.

8. The method of claim 7, wherein in the transmission of the transmission data, the representative network address is used through one of addressing systems including a classful addressing system, a classless inter-domain routing (CIDR) addressing system, and a locator identifier separation protocol (LISP).

9. The method of claim 7, wherein in the transmission of the packet-in data, the transmission data received from the at least one host is directly transmitted to the destination host if the destination host is present in a same sub-network as the at least one host is, and the packet-in data containing the transmission data is transmitted to the SDN controller if the destination host is not present in the same sub-network as the at least one host is.

10. The method of claim 7, wherein in the transmission of the packet-in data to the SDN controller, in a case where the SDN controller is connected to the upper-level SDN controller, the SDN controller serves as an SDN switch for the upper-level SDN controller.

11. The method of claim 7, wherein the transmission of the packet-in data to the SDN controller comprises:
obtaining information on the network topology by translating received or predesignated controller rules;
creating the at least one virtual SDN switch and the at least one virtual host that is connected to the at least one virtual SDN switch so as to construct a sub-network with the at least one virtual SDN switch and the at least one virtual host according to the obtained network topology information; and
transmitting the received packet-in data to an SDN controller of the destination host if the SDN controller of the destination host is connected to a same SDN controller as the SDN controller that has received the packet-in data is connected to, and transmitting the received packet-in data to a corresponding upper-level SDN controller that is one level higher than the same SDN controller.

12. The method of claim 7, wherein in the transmission of the packet-in data to the SDN controller, the packet-in data is transmitted in a form of a query to the upper-level SDN controller.

* * * * *